No. 719,966. PATENTED FEB. 3, 1903.
J. F. WILLIAMS.
ICE SHAVER.
APPLICATION FILED AUG. 28, 1902.
NO MODEL.
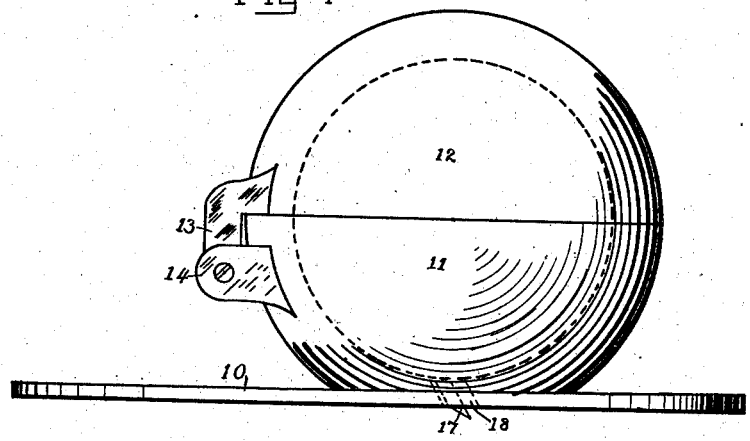
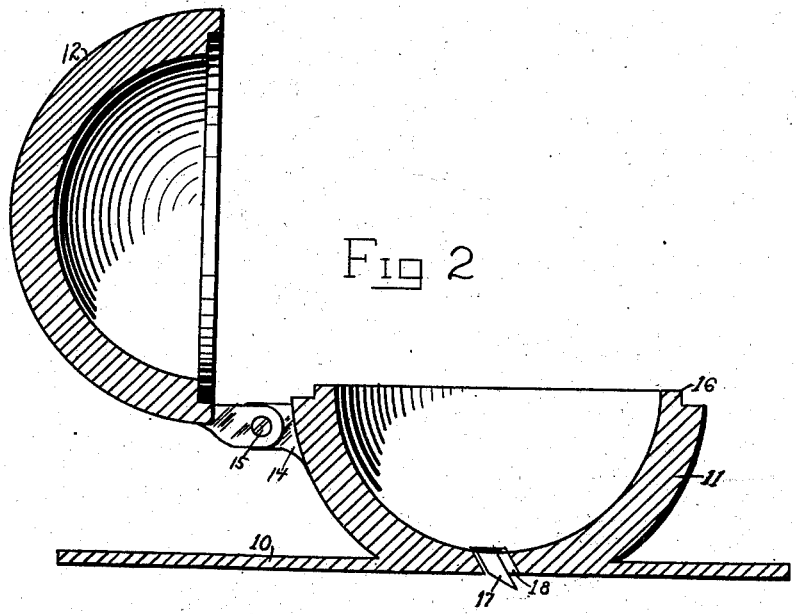
WITNESSES:
INVENTOR
James F. Williams
BY
V. H. Lockwood
ATTORNEY

UNITED STATES PATENT OFFICE.

JAMES F. WILLIAMS, OF VINCENNES, INDIANA, ASSIGNOR OF TWO-THIRDS TO FRANCIS SCHENKER, OF VINCENNES, INDIANA.

ICE-SHAVER.

SPECIFICATION forming part of Letters Patent No. 719,966, dated February 3, 1903.

Application filed August 28, 1902. Serial No. 121,396. (No model.)

*To all whom it may concern:*

Be it known that I, JAMES F. WILLIAMS, of Vincennes, county of Knox, and State of Indiana, have invented a certain new and useful Ice-Shaver; and I do hereby declare that the following is a full, clear, and exact description thereof, reference being had to the accompanying drawings, in which like figures refer to like parts.

The object of this invention is to form the ice-shavings into a mass of a certain shape—say like a snow-ball.

The general idea and one means for carrying out the idea will be understood from the accompanying drawings and the following description and claims.

In the drawings, Figure 1 is a side elevation of an ice-shaver embodying the invention. Fig. 2 is a central vertical longitudinal section.

In detail the drawings show a planer-plate 10 with a spherical vessel secured thereto. The vessel is formed of two halves, one half, 11, being secured to the plate 10 and the other half, 12, hinged to the half 11 by the ears 13 and 14 and pin 15. The half 11 has a peripheral flange or rib 16 for concentering the two halves while being closed. The halves 11 and 12 are kept closed by gravity or any desired means.

The ice is shaved by the knife 17, set in the slot 18, that penetrates the plate 10 and the half 11 of the vessel, and as the ice is shaved it passes necessarily through the slot into the vessel. This is continued until the vessel is filled tightly. Then the vessel is opened and the mass of shaven ice removed. When removed, it is in a mass shaped like the interior of the vessel, or like a snow-ball when removed from the device shown, and will retain that shape. The vessel in which the ice-shavings are thus packed may be of any desired shape. Likewise any means for holding the ice being shaved or bringing the knife and ice into shaving engagement may be employed in connection with this invention without departing from the spirit.

By continuing the shaving after the vessel is full the contents may be compressed to the desired degree to cause the same to retain the shape after removal from the vessel.

What I claim as my invention, and desire to secure by Letters Patent, is—

1. In an ice-shaver, a spherical vessel formed of two halves that may be closed and separated as desired, one half being externally flattened, a slot in such flattened portion, and a knife at said slot for shaving the ice.

2. An ice-shaver consisting of a plate, a spherical vessel formed of two separable halves, one half thereof secured to said plate, a slot through the plate and vessel, and a knife at said slot for shaving the ice.

In witness whereof I have hereunto affixed my signature in the presence of the witnesses herein named.

JAMES F. WILLIAMS.

Witnesses:
N. E. BECKES,
HENRY S. CAUTHORN, Jr.